US008346871B2

(12) United States Patent
Peters

(10) Patent No.: US 8,346,871 B2
(45) Date of Patent: *Jan. 1, 2013

(54) MAINTAINING MESSAGE PRIVACY ON AN EXPOSED DISPLAY DEVICE

(75) Inventor: Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1237 days.

This patent is subject to a terminal disclaimer.

(21) Appl. No.: 10/905,499

(22) Filed: Jan. 7, 2005

(65) Prior Publication Data

US 2006/0168007 A1 Jul. 27, 2006

(51) Int. Cl.
*G06F 15/16* (2006.01)
(52) U.S. Cl. .................... 709/206; 709/207
(58) Field of Classification Search .......... 709/204–207
See application file for complete search history.

(56) References Cited

U.S. PATENT DOCUMENTS

| 6,301,609 | B1 | 10/2001 | Aravamudan et al. | |
|---|---|---|---|---|
| 6,484,196 | B1 | 11/2002 | Maurille | 709/206 |
| 6,640,230 | B1 | 10/2003 | Alexander et al. | 707/10 |
| 6,909,406 | B2 * | 6/2005 | Wilburn et al. | 345/3.1 |
| 6,993,564 | B2 * | 1/2006 | Whitten, II | 709/207 |
| 7,035,865 | B2 | 4/2006 | Doss et al. | |
| 7,216,167 | B2 | 5/2007 | Hamilton, II et al. | |
| 7,243,124 | B1 * | 7/2007 | Gardner et al. | 709/205 |
| 7,499,973 | B2 * | 3/2009 | Couts et al. | 709/206 |
| 2001/0003202 | A1 | 6/2001 | Mache et al. | |
| 2004/0010808 | A1 | 1/2004 | deCarma | 725/139 |
| 2004/0015610 | A1 | 1/2004 | Treadwell | 709/246 |
| 2004/0078441 | A1 * | 4/2004 | Malik et al. | 709/206 |
| 2004/0133638 | A1 | 7/2004 | Doss et al. | 709/203 |
| 2004/0143633 | A1 | 7/2004 | McCarty | 709/206 |
| 2004/0186887 | A1 | 9/2004 | Galli et al. | |
| 2004/0196315 | A1 | 10/2004 | Swearingen et al. | |
| 2005/0021651 | A1 | 1/2005 | Fellenstein et al. | |
| 2005/0027669 | A1 | 2/2005 | Day et al. | |
| 2005/0027839 | A1 | 2/2005 | Day et al. | |
| 2005/0097473 | A1 * | 5/2005 | Malik et al. | 715/739 |

FOREIGN PATENT DOCUMENTS

WO 2004001558 A2 12/2003

OTHER PUBLICATIONS

Non-Final Office Action for U.S. Appl. No. 10/891,797, Office Communication dated Oct. 16, 2007, pp. 1-11, Published by the United States Patent and Trademark Office, Alexandria, VA, USA. United States Patent and Trademark Office, Notice of Allowance for U.S. Appl. No. 10/891,797, Apr. 28, 2008, pp. 1-11, Alexandria, VA, USA.

* cited by examiner

*Primary Examiner* — Minh-Chau Nguyen
(74) *Attorney, Agent, or Firm* — Lee Law, PLLC; Christopher B. Lee

(57) ABSTRACT

The invention is an instant-messaging system that minimizes undesirable alerts on an exposed output device. The instant-messaging system is configurable so that a user can select an alert mode that alters the instant-messaging system's response to receiving message data from a caller while a user is operating an exposed output device. Specifically, a user can select a "do-not-disturb" mode, a "designee" mode, a "caller-id" mode, or a "priority" mode. If the user selects the do-not-disturb mode, the system blocks the message and informs the caller that the user does not wish to be disturbed. If the user selects the caller-id mode, the system displays the caller's identification and then prompts the user to accept the message. If the user selects the priority mode, the system displays the caller's identification only if the caller is in the user's "priority list."

34 Claims, 7 Drawing Sheets

QUERY OUTPUT DEVICE FOR PROPERTIES THAT ARE KNOWN TO BELONG TO PROJECTION DEVICES — 1302

FIG. 13

QUERY A POWER MANAGEMENT MODE TO DETERMINE IF THE USER HAS PLACED COMPUTER IN A PRESENTATION MODE OR A VIEWING MODE — 1402

FIG. 14

MAINTAINING MESSAGE PRIVACY ON AN EXPOSED DISPLAY DEVICE

FIELD OF INVENTION

The present invention is a process for using electrical computers or data processing machines to transfer data via one or more communications media. In particular, the present invention comprises an improved demand-based messaging system that enables instant message recipients to protect their privacy on an exposed display device.

BACKGROUND OF THE INVENTION

Demand-based messaging is a communication service that allows users to exchange message data, such as text, over a network or other communications media, in real time. Probably the most common medium for exchange is the Internet. Instant messaging (IM) is perhaps the most widely known and used embodiment of demand-based messaging. Today, most network and online service providers offer some form of IM service.

IM users typically use a networked computer and IM client software to exchange messages with one another in conversational style. An IM client provides an interface for users to compose, send, receive, and read text messages. IM sessions (colloquially referred to as "chats") are often lengthy, with multiple participants each taking many turns "speaking" in the chat window. Examples of IM clients that are popular today include IBM's SameTime, MSN Messenger, and Yahoo/AOL Instant Messenger.

Typically, an IM service alerts an IM client whenever a user receives an instant message. The alert usually consists of a pop-up window or other visual indication on a user's display, but may include an audible indicator as well. Many IM clients, though, instantaneously display the message on the user's display without any alert. Most IM clients also allow a user to maintain a private list of other IM users. The IM client then alerts the user when the other users in the private list are online. Again, an alert usually consists of some visual or audible indication, or any combination of the two. The alerted user can then initiate a chat with the user in the private list who is online.

Occasionally, though, IM alerts can have unintended and undesirable effects. For instance, if a user's display is exposed to an audience when the user receives an alert, the alert also would be exposed to the entire audience. Examples of such exposed displays abound, including large screens used for slide show presentations and network-based multimedia presentations. Even if a user is merely allowing an associate to view the user's display and receives an alert, the associate also would be able to see or hear the alert. Not only are such situations potentially annoying or embarrassing, but they also could result in the unintended disclosure of personal or confidential information.

Presently, some IM clients can be configured to prevent some instances of undesirable alerts. Most IM clients, in fact, can be configured to allow messages only from a preferred group of users (such as those in the private list), to block messages only from certain users, or to block all messages from all users. Moreover, IM technology continues to evolve at a rapid pace, and more sophisticated techniques for managing a user's privacy have been disclosed recently.

In particular, U.S. patent publication 2004/10808 discloses a system for automatically managing a user's visibility and alerts on an IM network, based on the user's activity and activity-related preferences. Specifically, the user of such a system establishes preferences for an activity, such as watching a particular channel or video stream. The system then monitors the user's activity and manages IM alerts when the user is engaged in an activity with established preferences.

U.S. patent publication 2004/143633 discloses another privacy management technique in which privacy codes are exchanged between users before delivering an instant message. Although this technique protects the message itself, the IM client still alerts a user in the same manner after the privacy codes are accepted.

Although the techniques described above may prevent some instances of undesirable alerts on an exposed display, they also may prevent some instances of desired alerts. Thus, there is still a need in the art for an IM client that provides users with more sophisticated control over the information that the IM client displays on an exposed display device. The invention described in detail below addresses this need.

SUMMARY OF THE INVENTION

The invention described below is an improved instant-messaging system that minimizes undesirable alerts on an exposed output device. The system typically includes an instant-messaging program operable on a data processing machine to receive message data from a caller over a communications medium. The instant-messaging program is user-configurable so that a user can select an alert mode that alters the instant-messaging program's response to receiving message data from a caller when a user is operating an exposed output device. Specifically, a user can select either a "do-not-disturb" mode, a "designee" mode, a "caller-id" mode, or a "priority" mode. If the user selects the do-not-disturb mode, the instant-messaging program blocks the message data and informs the caller that the user does not wish to be disturbed. If the user selects the caller-id mode, the instant-messaging program displays the caller's identification and then prompts the user to accept or deny the message data. If the user selects the priority mode, the instant-messaging program displays the caller's identification only if the caller is in the user's "priority list."

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 3, FIG. 4, FIG. 5, FIG. 6, FIG. 7, FIG. 8, FIG. 9, FIG. 10, FIG. 11, FIG. 12, FIG. 13, and FIG. 14 are flowcharts of computer programs and portions of computer programs embodying the present invention.

DETAILED DESCRIPTION OF THE PREFERRED EMBODIMENT

Figure 1:
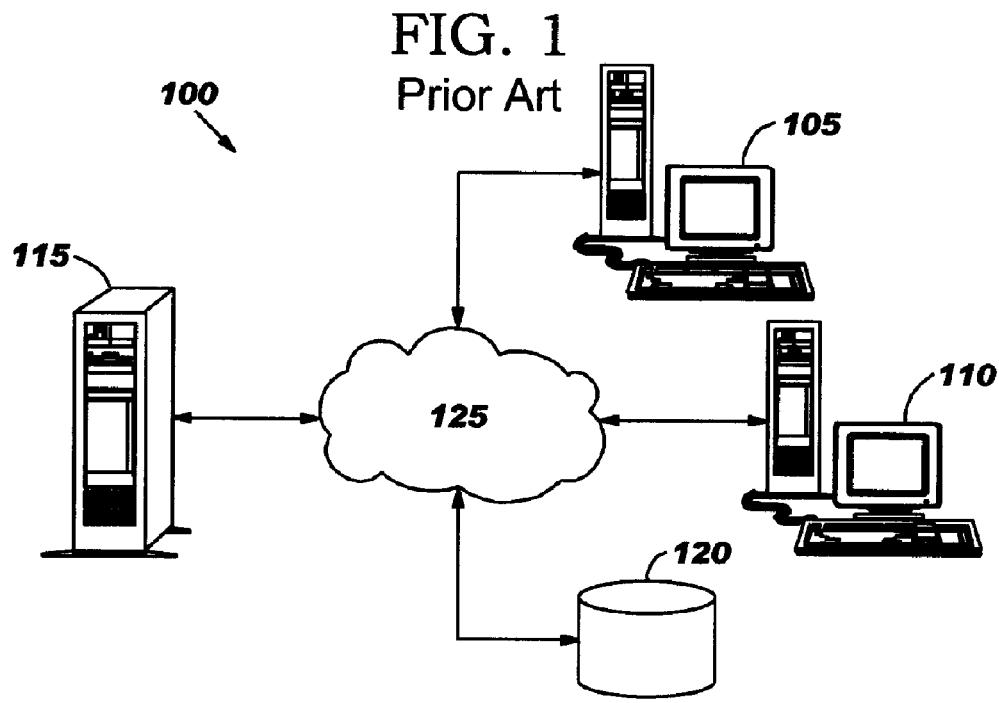
FIG. 1 is a flowchart of the improved instant-messaging program.

As is well-known in the computing arts, there are often a variety of means for implementing any given processing function. In particular, most processing may be implemented with computer hardware, computer software, or any combination thereof. Likewise, the principles of the present invention are applicable to a variety of computer hardware and software configurations, and the means for implementing any given function described below, whether hardware or software, are illustrative only. From this description, any person of ordinary skill in the computing arts may readily develop equivalent combinations of hardware and software that perform identical functions.

The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "instant-messaging (IM)" program.

Means for enabling an operator to interact with such a computer program are well-known in the art. The particular means for enabling an operator to enter or view data are of little significance to the novelty of the present invention, and generally are not described in detail here. Thus, for the purposes of describing a preferred embodiment, and unless otherwise indicated, the inventive computer program interacts with an operator through conventional means, such as keyboards, mice, video monitors, input files, dialog boxes, voice recognition, or the like, although a person of ordinary skill in the art may readily recognize additional hardware, software, or any combination thereof that performs the identical function.

The functions of the IM program described below are applicable to many different messaging scenarios, including scenarios wherein any program, device driver, operating system, or the like attempts to notify a user of an event or condition through audio or visual cues. Nonetheless, for the sake of simplicity and clarity, the IM program is described below in the context of a typical chat session in which the term "caller" refers to any user of an IM system who attempts to initiate a chat with a recipient. The term "recipient," as used herein, refers to any user of the IM program. Moreover, the following discussion generally assumes that the recipient is using a computer with an exposed output device. As used herein, an "output device" is any hardware operable to display data to a user, and an "exposed" output device is any output device visible to anyone other than the recipient.

Additionally, the IM program is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
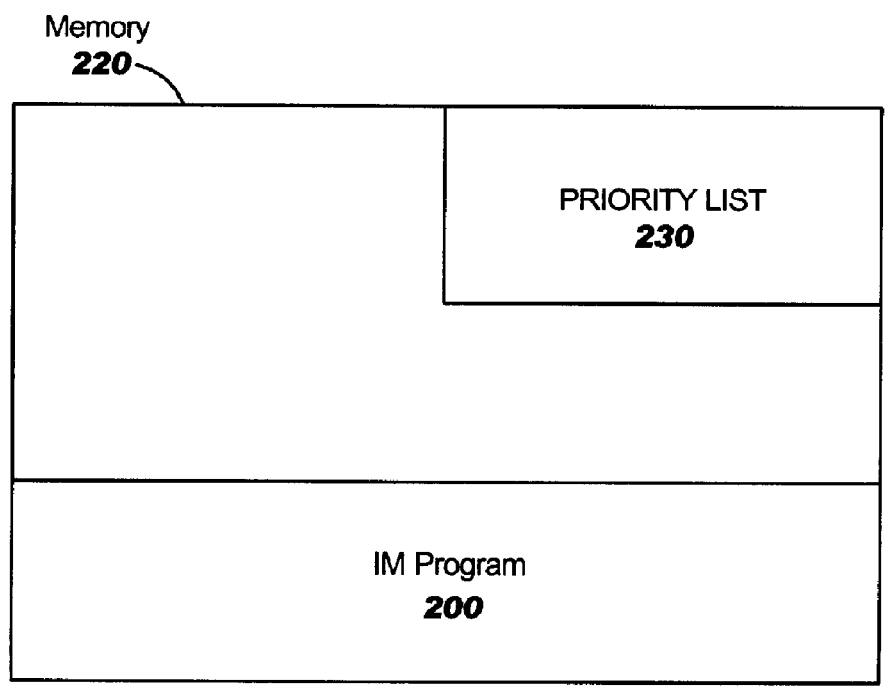
FIG. 2 is a representative schematic of a memory having the components of the present invention.

IM program 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to IM program 200, memory 220 may include priority list 230 with which IM program 200 interacts.

Figure 4:
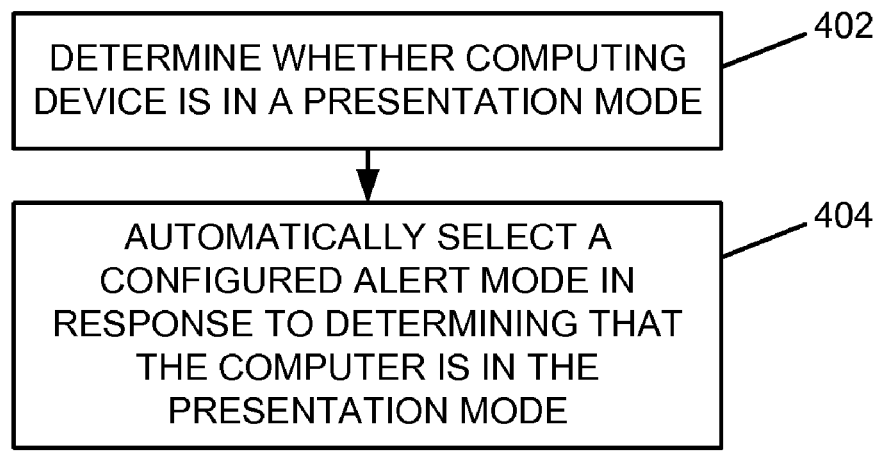
Figure 5:
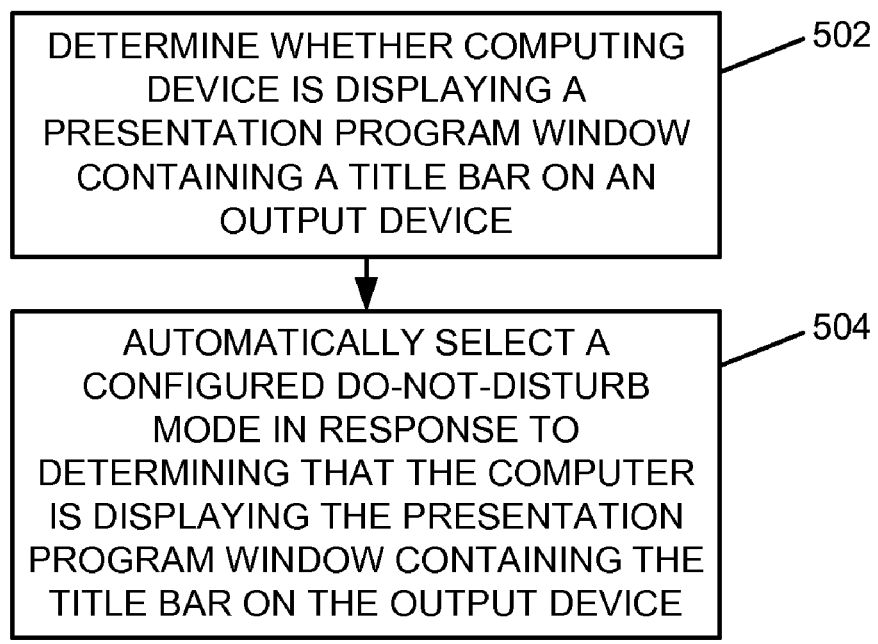
Figure 6:
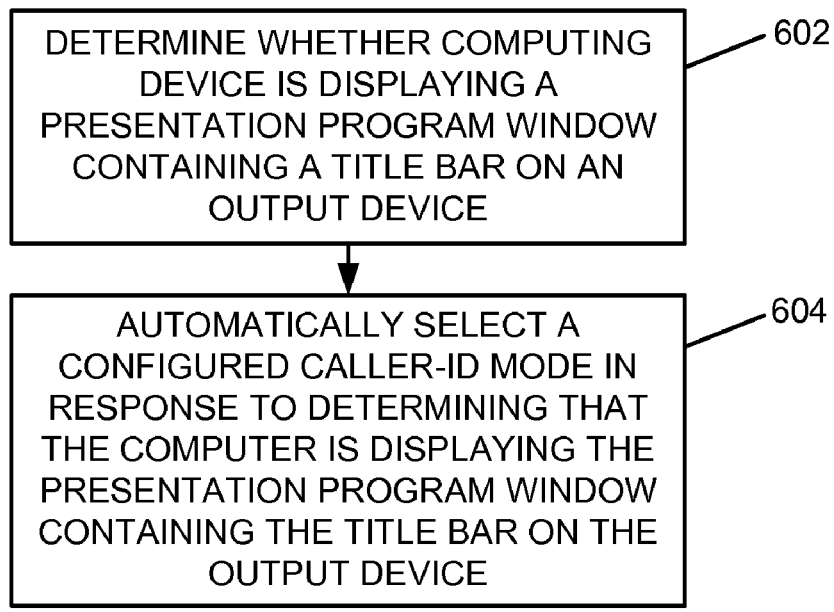
Figure 7:
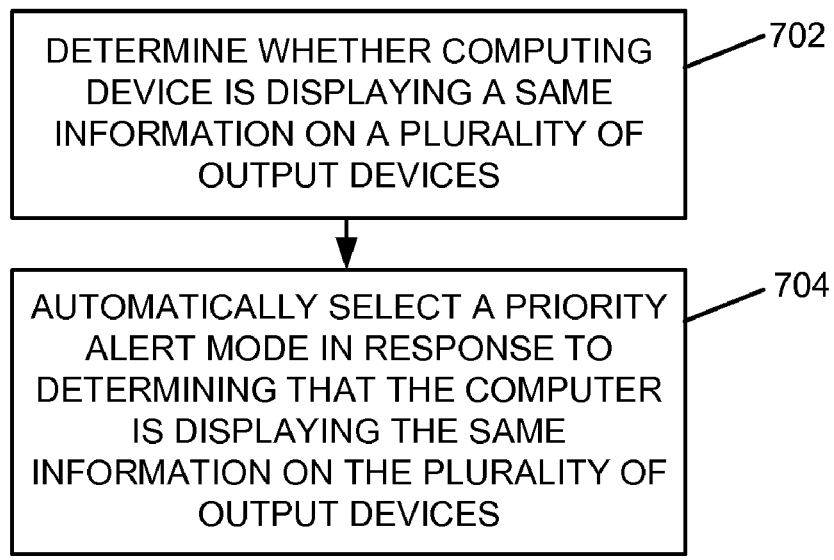
Figure 8:
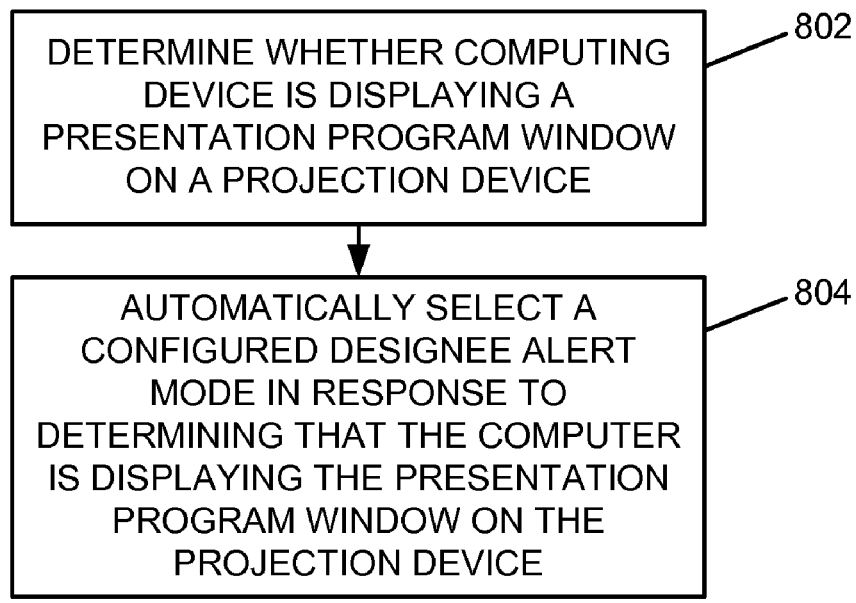
Figure 9:
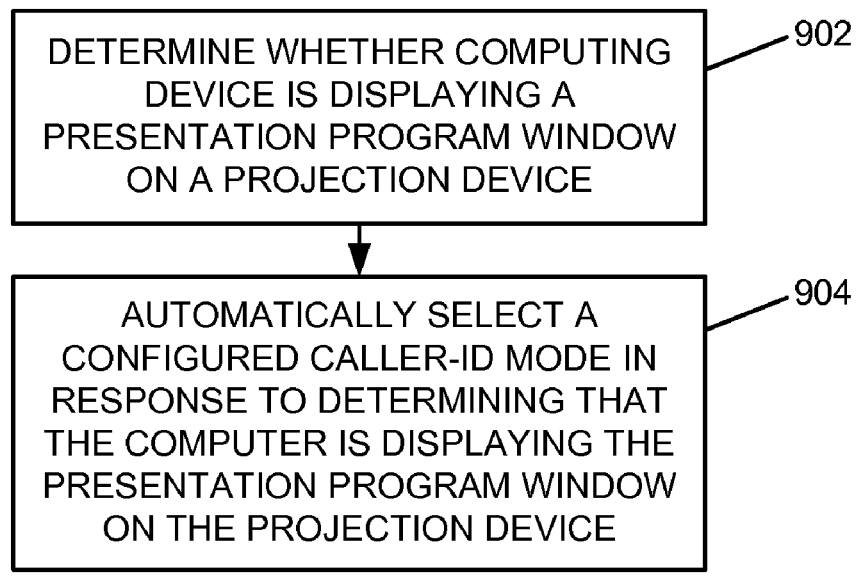
Figure 10:
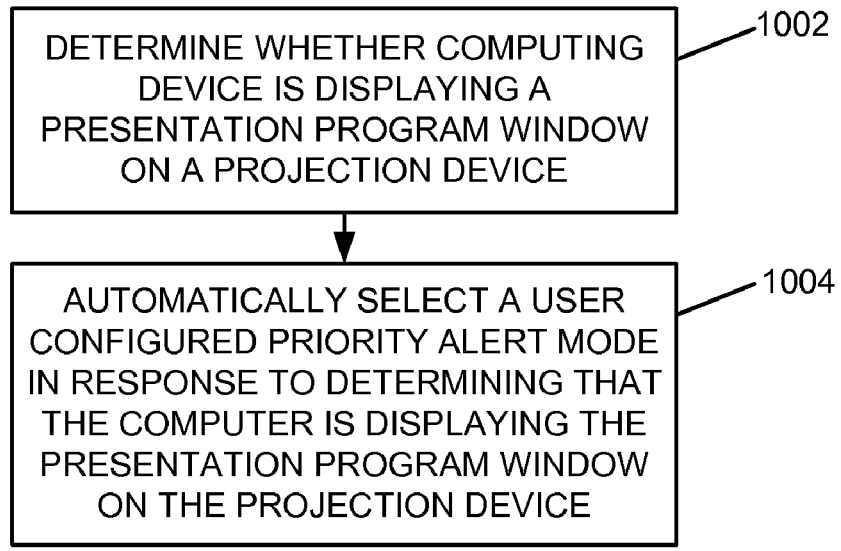
Figure 11:
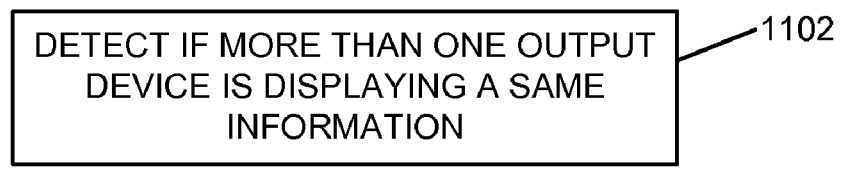
Figure 12:

Operating systems, such as MICROSOFT WINDOWS, often know what types of devices are attached to the video adapter, and IM program 200 can obtain the device type from the operating system. Similarly, IM program 200 can obtain information about other programs from the operating system. For example, if a user is running a network conferencing program, such as MICROSOFT NETMEETING or WEBEX, IM program 200 can obtain this information from the operating system to determine that computer is in presentation mode. Moreover, presentation programs such as MICROSOFT POWERPOINT generally display slides in a window without a title bar when in presentation mode. Thus, IM program 200 can query such a presentation program to see if the program's window has a title bar (FIG. 5, element 502; FIG. 6, element 602). Other means for determining when a workstation is in a presentation mode (FIG. 4, element 402) include: detecting if more than one output device is displaying the same information (such as an external monitor and an LCD screen on a laptop) (FIG. 7, element 702; FIG. 11, element 1102); comparing an output device with a list of known projection devices (FIG. 8, element 802; FIG. 9, element 902; FIG. 10, element 1002; FIG. 12, element 1202); querying an output device for properties that are known to belong to projection devices (FIG. 13, element 1302); or querying the workstation's power management mode to determine if the user has placed it in presentation mode or DVD viewing mode (FIG. 14, element 1402).

A situation may arise in which a user is giving a presentation on the user's own output device and the user's own output device will not be detected as an exposed output device. In such a situation, the user may manually designate the user's output device as an exposed device.

Thus, if a projector or the like is attached, if the recipient is using presentation software in presentation mode (FIG. 4, element 402), IM program 200 can acquire this information from the operating system or other program. IM program 200 then assumes that the workstation is configured for a presentation and automatically selects the recipient's desired alert mode (FIG. 4, element 404; FIG. 8, element 804; FIG. 9, element 904; FIG. 10, element 1004). Optionally, this information may be used to update the recipient's status icon and status message as seen by other IM users. Or, rather than make an automatic selection, IM program 200 may prompt the recipient to confirm the change in alert mode. In yet another embodiment, the recipient configures IM program 200 to select a desired alert mode based upon schedule data in a personal information manager program or a calendar program, so that IM program 200 selects the appropriate mode if, according to the schedule data, the recipient is in a meeting or the like.

Figure 3:
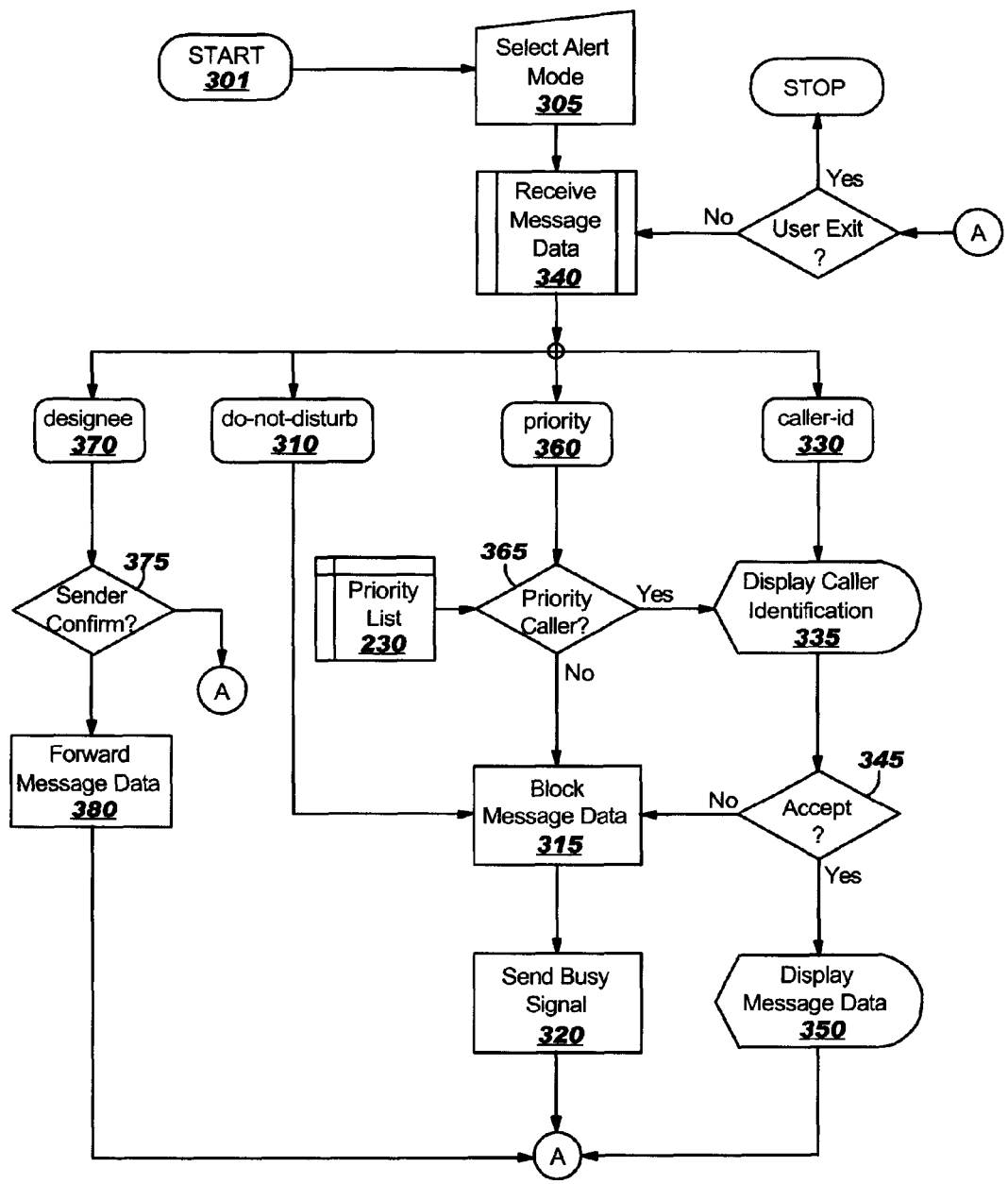

FIG. 3 is a flowchart of IM program 200. For illustrative purposes, the following discussion of FIG. 3 assumes that IM program 200 is stored within the memory of workstation 105. Thus, once started (301) IM program 200 continuously monitors workstation 105 for configuration changes, and monitors network connection 125 for message data addressed to the recipient using workstation 105. After starting IM program 200, the recipient selects a desired alert mode (305). Alternatively, the recipient configures IM program 200 to select a desired alert mode automatically when workstation 105 is configured for a presentation (FIG. 4, element 404; FIG. 5, element 504; FIG. 8, element 804). Alert modes are a means for identifying the recipient's messaging preferences and processing message data during a presentation. In the embodiment described below, alert modes include a "do-not-disturb" mode (FIG. 5, element 504), a "designee" mode, a "caller-id" mode (FIG. 6, element 604; FIG. 9, element 904), and a "priority" mode (FIG. 7, element 704; FIG. 10, element 1004).

If the recipient selects the do-not-disturb mode (310), then IM program 200 blocks incoming message data (315) and informs all callers that the recipient is busy (320).

If the recipient selects the caller-id mode (330), then IM program 200 displays a caller's identification (335), such as the caller's real name or email address, upon receiving the caller's message data (340). IM program 200 then prompts the recipient to accept or refuse the message data (345). If the recipient opts to accept the message data from the caller, then IM program 200 displays the message data on the recipient's output device (350). If the recipient opts to refuse the message data, then IM program 200 blocks the incoming message data (315) and informs the caller that the recipient is busy (320).

If the recipient selects the priority mode (360), then IM program 200 blocks incoming message data (315) unless a caller is in the recipient's priority list 230 (365). If the caller is in priority list 230, then IM program 200 displays the caller's identification (335), or in an alternative embodiment, IM program 200 prompts the priority caller before displaying the caller's identification to confirm that the message is urgent before displaying the caller's identification. IM program 200 then prompts the recipient to accept or refuse the message data (345). If the recipient opts to accept the message data from the priority caller, then IM program 200 displays the message data on the recipient's output device (350). If the recipient opts to refuse the message data, then IM program 200 blocks incoming message data (315) and informs all callers that the recipient is busy (320). Note that, as used herein, the term "priority list" refers to any list or other data structure, such as an address book, in which the recipient has identified specific IM users for whom IM program 200 should display their identification and prompt the recipient to accept or refuse the message data. In a preferred embodiment, priority list 230 is internal to IM program 200 and IM program 200 provides an interface through which the recipient can manage priority list 230. For instance, IM program 200 can automatically configure priority list 230 by adding everyone in the recipient's address book to the priority list. Other alternatives include IM program 200 identifying and adding peers and higher ranking associates within an organization to priority list 230, or allowing the recipient to add individual contacts to priority list 230.

Finally, if the recipient selects designee mode (370), IM program 200 notifies any sender that the recipient has designated an alternate recipient and prompts the sender to confirm that the message should be sent to the alternate recipient (375). If the sender confirms, IM program 200 then forwards any incoming message data to an alternate recipient (380), whom the recipient designates in advance. The designee mode is particularly useful if the recipient will be giving a presentation, but has an associate either assisting with the presentation or in the audience. In such a scenario, the recipient can designate the associate as the alternate recipient, and the alternate recipient then can respond to any messages that might affect meeting logistics during the presentation. Moreover, in alternative or additional embodiments of IM program 200, the designee mode may be combined with the priority mode or the caller-id mode to achieve even greater control over IM alerts. In such an embodiment, either the recipient or the alternate recipient selects such an enhanced mode, specifying either the priority mode or the caller-id mode. Then, either before or after forwarding the message to the alternate recipient, IM program 200 would process the message as described in detail above.

As noted above, the functions of IM program 200 also are applicable to other scenarios, including scenarios wherein any program, device driver, operating system, or the like attempts to notify a user of an event or condition while the user is operating an exposed output device. A dialog box or the like is the most common notification means. In such scenarios, a person of ordinary skill in the art may readily adapt the program to respond accordingly. Specifically, blocking the notification as described above may not be the most appropriate response, and it may be more advantageous merely to minimize the dialog box until the user is no longer operating the exposed output device. Alternatively, IM program 200 could be adapted to place the dialog box immediately in the background, and restore the presentation to the foreground, thus hiding the notification until the presentation is complete.

Preferred forms of the invention have been shown in the drawings and described above, but variations in the preferred forms will be apparent to those skilled in the art. The preceding description is for illustration purposes only, and the invention should not be construed as limited to the specific form shown and described. The scope of the invention should be limited only the language of the following claims.

What is claimed is:

1. A computer messaging system, comprising:
   a communications medium;
   an output device; and
   a computer connected to the communications medium and the output device, configured to:
   determine whether the computer is in a presentation mode;
   automatically select a configured alert mode in response to determining that the computer is in the presentation mode;
   receive message data through the communications medium;
   process the message data according to the automatically selected alert mode when the computer is in the presentation mode; and
   transfer the message data to an alternate recipient;
   where the computer is further configured to determine whether the computer is in the presentation mode by being configured based upon a configuration selected from a group consisting of:
   being configured to detect if more than one output device is displaying a same information;

being configured to compare the output device with a list of known projection devices;
being configured to query the output device for properties that are known to belong to projection devices; and
being configured to query a power management mode to determine if a user has placed the computer in the presentation mode or a viewing mode.

2. The computer messaging system of claim 1, wherein the message data is received from a caller and the computer is further configured to display only the caller's identification on the output device.

3. The computer messaging system of claim 2, wherein the computer is further configured to prompt the user to accept the message data from the caller and to display the message data on the output device only when the user responds affirmatively to the prompt.

4. The computer messaging system of claim 3, wherein the computer is further configured to send the caller a busy signal when the user responds negatively to the prompt.

5. The computer messaging system of claim 1, where the computer is further configured to determine a priority caller list; and wherein the message data is received from a caller and the computer is further configured to display the caller's identification on the output device only when the caller is in the priority caller list.

6. The computer messaging system of claim 5, wherein the computer is further configured to prompt the user to accept the message data from the caller, and to display the message data on the output device only when the user responds affirmatively to the prompt.

7. The computer messaging system of claim 6, wherein the computer is further configured to send a busy signal to the caller when the user responds negatively to the prompt.

8. The computer messaging system of claim 5, wherein the computer is further configured to block the message data when the caller is not in the priority caller list.

9. The computer messaging system of claim 5, wherein the computer is further configured to send a busy signal to the caller when the caller is not in the priority caller list.

10. The computer messaging system of claim 1, wherein the message data is received from a caller and the computer is further configured to send a busy signal to the caller.

11. The computer messaging system of claim 1, wherein the message data is received from a caller and the computer is further configured to prompt the caller to transfer the message data to an alternate recipient and to transfer the message data to the alternate recipient only when the caller responds affirmatively to the prompt.

12. An instant-messaging program product, encoded in a non-transitory computer-readable storage medium, comprising instructions that, when executed by a computer, cause the computer to:
determine whether the computer is displaying a presentation program window on a projection device;
enable the computer to receive message data from a caller; and
automatically select a configured designee alert mode in response to determining that the computer is displaying the presentation program window on the projection device;
wherein, responsive to receiving the message data while the computer is displaying the presentation program window on the projection device, the designee alert mode causes the computer to transfer the message data to an alternate recipient;
the instant-messaging program product further comprising instructions selected from a group consisting of:
instructions that, when executed by the computer, cause the computer to detect if more than one output device is displaying a same information;
instructions that, when executed by the computer, cause the computer to compare an output device with a list of known projection devices;
instructions that, when executed by the computer, cause the computer to query the output device for properties that are known to belong to projection devices; and
instructions that, when executed by the computer, cause the computer to query a power management mode to determine if a user has placed the computer in a presentation mode or a viewing mode.

13. The instant-messaging program product of claim 12, further comprising instructions that, when executed by the computer, cause the computer to:
automatically select configured caller-id alert mode in response to determining that the computer is displaying the presentation program window on the projection device; and
wherein, upon receiving the message data while the computer is displaying the presentation program window on the projection device, the caller-id alert mode, when automatically selected, causes the computer to display only the caller's identification on an output device.

14. The instant-messaging program product of claim 13, wherein the caller-id alert mode, when automatically selected, further causes the computer to prompt the alternate recipient to accept the message data from the caller, and causes the computer to display the message data on the output device only when the alternate recipient responds affirmatively to the prompt.

15. The instant-messaging program product of claim 14, wherein the caller-id alert mode, when automatically selected, further causes the computer to send a busy signal to the caller when the alternate recipient responds negatively to the prompt.

16. The instant-messaging program product of claim 12, further comprising instructions that, when executed by the computer, further cause the computer to:
automatically select a user configured priority alert mode in response to determining that the computer is displaying the presentation program window on the projection device; and
configure a priority caller list;
wherein, upon receiving the message data while the computer is in a DVD viewing mode, the priority alert mode, when automatically selected, causes the computer to display the caller's identification on an output device only when the caller is in the priority caller list.

17. The instant-messaging program product of claim 16, wherein the priority alert mode, when automatically selected, further causes the computer to prompt the alternate recipient to accept the message data from the caller, and causes the computer to display the message data on the output device only when the alternate recipient responds affirmatively to the prompt.

18. The instant-messaging program product of claim 17, wherein the priority alert mode, when automatically selected, further causes the computer to send a busy signal to the caller when the alternate recipient responds negatively to the prompt.

19. The instant-messaging program product of claim 16, wherein the priority alert mode, when automatically selected, further causes the computer to block the message data when the caller is not in the priority caller list.

20. The instant-messaging program product of claim 16, wherein the priority alert mode, when automatically selected, further causes the computer to send a busy signal to the caller when the caller is not in the priority caller list.

21. An instant-messaging program product, encoded in a non-transitory computer-readable storage medium, comprising instructions that, when executed by a computer, cause the computer to:
   determine whether the computer is displaying a window containing a title bar on an output device;
   enable the computer to receive message data from a caller;
   automatically select a configured designee alert mode;
   automatically select a configured caller-id alert mode;
   automatically select a configured priority alert mode; and
   configure a priority caller list;
   wherein, responsive to receiving the message data while the computer is displaying the window containing the title bar, and responsive to the automatic selection of the designee alert mode, cause the computer to transfer the message data to an alternate recipient;
   wherein, responsive to receiving the message data while the computer is displaying the window containing the title bar, and responsive to the automatic selection of the caller-id alert mode, cause the computer to display only the caller's identification on the output device; and
   wherein, responsive to receiving the message data while the computer is displaying the window containing the title bar, and responsive to the automatic selection of the priority alert mode, cause the computer to display the caller's identification on the output device only when the caller is in the priority caller list.

22. The instant-messaging program product of claim 21, further comprising instructions that, when executed by the computer, further cause the computer to:
   automatically select a configured do-not-disturb mode; and
   wherein, responsive to receiving the message data when the computer is displaying the window containing the title bar, and responsive to the automatic selection of the do-not-disturb mode, cause the computer to block the message data.

23. The instant-messaging program product of claim 22, wherein the do-not-disturb mode, when automatically selected, further causes the computer to send a busy signal to the caller.

24. The instant-messaging program product of claim 21, further comprising instructions selected from a group consisting of:
   instructions that, when executed by the computer, cause the computer to detect if more than one output device is displaying a same information;
   instructions that, when executed by the computer, cause the computer to compare the output device with a list of known projection devices;
   instructions that, when executed by the computer, cause the computer to query the output device for properties that are known to belong to projection devices; and
   instructions that, when executed by the computer, cause the computer to query a power management mode to determine if the user has placed the computer in a presentation mode or a viewing mode.

25. An instant-messaging program product, encoded in a non-transitory computer-readable storage medium, comprising instructions that, when executed by a computer, cause the computer to:
   determine whether the computer is displaying a presentation program window containing a title bar on an output device;
   enable the computer to receive message data from a caller; and
   automatically select a configured caller-id alert mode in response to determining that the computer is displaying the presentation program window containing the title bar on the output device;
   wherein, responsive to receiving the message data while the computer is displaying the presentation program window containing the title bar, the caller-id alert mode causes the computer to display only the caller's identification on the output device and to transfer the message data to an alternate recipient;
   the instant-messaging program product further comprising instructions selected from a group consisting of:
   instructions that, when executed by the computer, cause the computer to detect if more than one output device is displaying a same information;
   instructions that, when executed by the computer, cause the computer to compare the output device with a list of known projection devices;
   instructions that, when executed by the computer, cause the computer to query the output device for properties that are known to belong to projection devices; and
   instructions that, when executed by the computer, cause the computer to query a power management mode to determine if a user has placed the computer in a presentation mode or a viewing mode.

26. The instant-messaging program product of claim 25, wherein the caller-id alert mode, when automatically selected, further causes the computer to prompt the user to accept the message data from the caller, and causes the computer to display the message data on the output device only when the user responds affirmatively to the prompt.

27. The instant-messaging program product of claim 26, wherein the caller-id alert mode, when automatically selected, further causes the computer to send a busy signal to the caller when the user responds negatively to the prompt.

28. An instant-messaging program product, encoded in a non-transitory computer-readable storage medium, comprising instructions that, when executed by a computer, cause the computer to:
   determine whether the computer is displaying a same information on a plurality of output devices;
   cause the computer to receive message data from a caller;
   automatically select a priority alert mode in response to determining that the computer is displaying the same information on the plurality of output devices; and
   automatically configure a priority caller list in response to automatic selection of the priority alert mode;
   wherein, responsive to receiving the message data while the computer is displaying the same information on the plurality of output devices, the priority alert mode causes the computer to display the caller's identification on the plurality of output devices only when the caller is in the priority caller list and to transfer the message data to an alternate recipient;
   the instant-messaging program product further comprising instructions selected from a group consisting of:
   instructions that, when executed by the computer, cause the computer to compare each of the plurality of output devices with a list of known projection devices;

instructions that, when executed by the computer, cause the computer to query each of the plurality of output devices for properties that are known to belong to projection devices; and instructions that, when executed by the computer, cause the computer to query a power management mode to determine if a user has placed the computer in a presentation mode or a viewing mode.

29. The instant-messaging program product of claim 28, wherein the priority alert mode, when automatically selected, further causes the computer to prompt the user to accept the message data from the caller, and causes the computer to display the message data on the output device only when the user responds affirmatively to the prompt.

30. The instant-messaging program product of claim 29, wherein the priority alert mode, when automatically selected, further causes the computer to send a busy signal to the caller when the user responds negatively to the prompt.

31. The instant-messaging program product of claim 28, wherein the priority alert mode, when automatically selected, further causes the computer to block the message data when the caller is not in the priority caller list.

32. The instant-messaging program product of claim 28, wherein the priority alert mode, when automatically selected, further causes the computer to send a busy signal to the caller when the caller is not in the priority caller list.

33. An instant-messaging program product, encoded in a non-transitory computer-readable storage medium, comprising instructions that, when executed by a computer, cause the computer to:

determine whether the computer is displaying a presentation program window containing a title bar on an output device;

enable the computer to receive message data; and automatically select a configured do-not-disturb mode in response to determining that the computer is displaying the presentation program window containing the title bar on the output device;

wherein, responsive to receiving the message data while the computer is displaying the presentation program window containing the title bar on the output device, the do-not-disturb mode causes the computer to block the message data from being displayed on the output device and to transfer the message data to an alternate recipient;

the instant-messaging program product further comprising instructions selected from a group consisting of:

instructions that, when executed by the computer, cause the computer to detect if more than one output device is displaying a same information;

instructions that, when executed by the computer, cause the computer to compare the output device with a list of known projection devices;

instructions that, when executed by the computer, cause the computer to query the output device for properties that are known to belong to projection devices; and instructions that, when executed by the computer, cause the computer to query a power management mode to determine if a user has placed the computer in a presentation mode or a viewing mode.

34. The instant-messaging program product of claim 33, wherein the message data is received from a caller and the do-not-disturb mode, when automatically selected, further causes the computer to send a busy signal to the caller.

* * * * *